Aug. 19, 1958                R. N. BOOTH                2,848,582
                           CONTROL APPARATUS
                         Filed March 29, 1957

INVENTOR.
RUSSELL N. BOOTH
BY Philip J. Zuimoch
ATTORNEY

United States Patent Office 2,848,582
Patented Aug. 19, 1958

2,848,582

CONTROL APPARATUS

Russell N. Booth, Lakeville, Minn., assignor to Minneapolis-Honeywell Regulator Company, Minneapolis, Minn., a corporation of Delaware Application March 29, 1957, Serial No. 649,462

14 Claims. (Cl. 200—139)

The present invention is directed to condition control apparatus, especially temperature control apparatus associated with a control device, of the type which includes means for manually varying the control point at which the control device can be actuated by a condition responsive element of the control apparatus.

There are, of course, many condition control arrangements available wherein the control point of the arrangement can be manually varied. However, improved arrangements are always sought that are low in cost, simple in design so as to be easy to manufacture and assemble, and accurate in operation. The arrangement disclosed herein fulfills the foregoing requirements, as will become evident later.

In the present arrangement, the manual adjustment means provided for varying the control point of a condition control arrangement comprises a manually adjustable member including a cam portion which cooperates with a first extremity of a first lever, a second extremity of which is pivotally secured against movement, to cause oscillation of the first lever about the pivot provided by the second extremity upon positioning the manually adjustable member to thereby result in movement of a second lever, carried by the first lever and engaged at a first portion by a condition responsive element and engaged at a second portion by the actuating portion of a control device, to vary the degree of actuation of the control device. All of the elements of the adjustment arrangement of the control apparatus are formed either by simple punch press operations or elementary metal forming operations.

Therefore, it is an object of this invention to provide a condition control apparatus with adjustment means for varying the control point of the apparatus which is simple, accurate, and inexpensive.

It is a further object of this invention to provide a condition control apparatus with an adjustable control point arrangement which requires only elements formed by simple metal working procedures and which is easy to assemble.

These and other objects will become apparent from a reading of the following specification and appended claims wherein:

Figure 1:
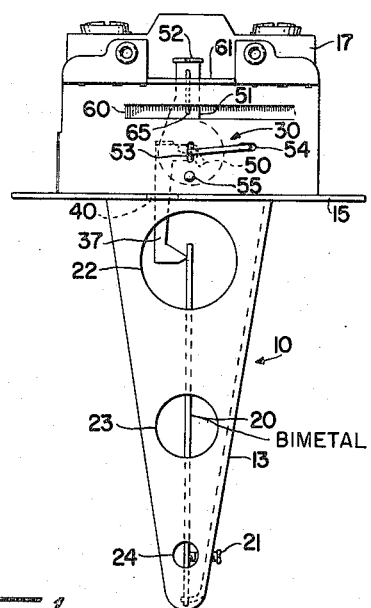
Figure 1 is a view of a temperature control apparatus including the improved adjustable control point arrangement.
Figure 2:
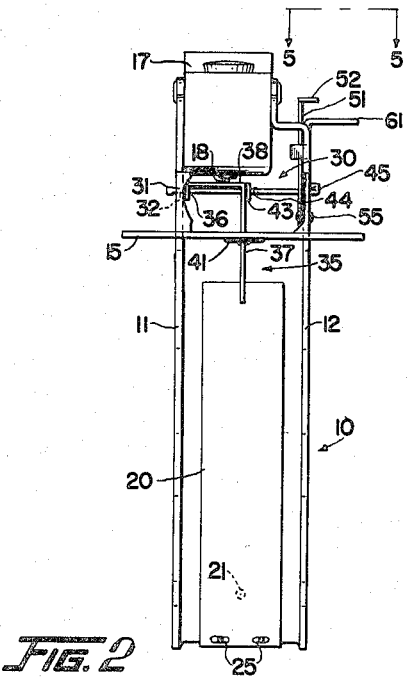
Figure 2 is a left side view of the apparatus including the adjustable control point arrangement shown in Figure 1.

Referring to Figures 1 and 2, the temperature control arrangement includes a U-shaped channel housing 10 having side members 11 and 12 and a bottom member 13. The side members 11 and 12 and the bottom member 13 are passed through a U-shaped opening, not shown, in a mounting plate 15 during assembly and appropriately secured to the mounting plate 15. The fabrication and assembly of the housing 10 and the mounting plate 15 is more clearly shown in my co-pending application 693,299, filed October 31, 1957, and assigned to the present assignee. Snap action switch 17, having an operating plunger 18, is disposed between the side members 11 and 12 of the housing 10 and secured thereto by appropriate fastening means. A control element in the form of a bimetal 20 has a first end portion staked at 25 to an end portion of the bottom member 13 of the housing 10. Adjustment member 21, in the form of a screw, is provided in the bottom portion 13 of the housing 10 to allow for calibration. To allow even distribution of the heat conducting medium to the bimetal element 20, a plurality of openings 22, 23, and 24 are provided in the side members 11 and 12 of the housing 10. It will be understood that the temperature control arrangement is to be utilized with a furnace, or similar device, and mounted thereon and secured thereto by the mounting plate 15 and appropriate fastening means. The portion of the housing 10 containing the bimetal element 20 is to be located within the bonnet of the furnace, or similar area, so as to be exposed to the heat conducting medium.

A manual adjustable means is provided for varying the control point. Varying the control point is accomplished by adjusting the position of levers 30 and 35 with respect to the bimetal element 20 and the switch 17. Referring again to Figures 1 and 2, a first lever 30 in the form of a pin has a first end portion 31 which passes through an opening 32 in the side member 11 and is thereupon crimped to prevent longitudinal movement of the lever 30 in one direction. A second lever 35 in the form of a U channel member includes side members 36 and 37 and connecting member 38. The side members 36 and 37 have openings provided therein arranged to receive the lever 30 thereby making the lever 35 rotatable about the longitudinal axis thereof. The connecting member 38 of the lever 35 engages the operating plunger 18 of the switch 17. The side member 37 of the lever 35 passes through an opening 40 in the mounting plate 15 and is arranged to be positioned by a second end portion of the bimetal element 20. A duster 41 is passed over the end portion of the side member 37 of the lever 35 and is located over the opening 40 in the mounting plate 15 to reduce the passage of contaminants through the opening 40. The lever 30 also has a washer 43 located thereon and so positioned that a second crimped portion 44 of the lever 30 makes the lever 35 a captive between the side member 11 and the washer 43. This arrangement also prevents longitudinal movement of the lever 30 in a second direction.

An adjustment member 51 having a cam portion in the form of an arcuate opening 50 is arranged for rotational movement about a pin 55 which secures the adjustment member 51 to the side member 12 of the housing 10. The adjustment member 51 includes a portion disposed through an opening formed in the side member 12 by the displacement of the portion 60 with respect to the remainder of the side member 12. A scale portion 61 is provided by the side member 12 and is associated with a manual operating portion 52 of the adjustment member 51.

The second end portion 45 of the lever 30 passes through the arcuate opening 50 located in the adjustment member 51 and through a first oblong opening 53 located in the side member 12 of the housing 10. Further, the second end portion 45 of the lever 30 is bent twice at right angles to the longitudinal axis of the portion of the lever 30 disposed between the side members 11 and 12 so the extremity thereof passes through and is disposed in a second oblong opening 54 provided in the side member 12.

An examination of Figures 1 and 2 will indicate that a rotational movement of the adjustment member 51 about the pivot formed by pin 55 results in movement of the arcuate portion 50 thereof with respect to the oblong opening 53 located in the side member 12. For a clearer showing of this, reference will now be made to the enlarged views of the adjustable control point arrangement shown in Figures 3 and 4. As to Figure 3, all but a portion of the side member 12 has been removed to more clearly show the arrangement and operation of the elements which form the adjustable control point arrangement. It will be noted that the adjustment member 51 has a raised portion or dimple 65 and a raised portion or dimple 66 which when coupled with the displaced portion 60 of the side member 12 and the side member 12, respectively, cooperate to provide a frictional holding means for the member 51 with respect to the displaced portion 60 of the side member 12 and the side member 12.

Figure 3:
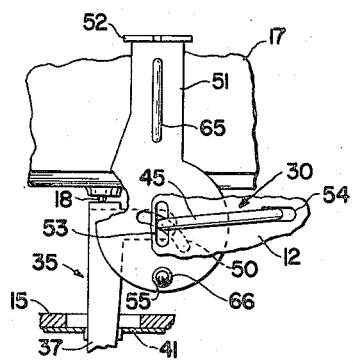
Figure 3 is an enlarged fragmentary view of Figure 1 showing the adjustable control point arrangement.
Figure 4:
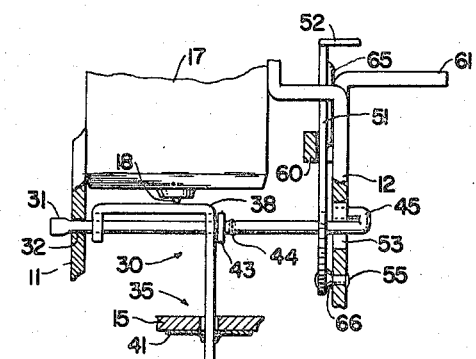
Figure 4 is an enlarged fragmentary view of Figure 2 showing the adjustable control point arrangement.

An examination of Figures 3 and 4 will more clearly show or indicate what can be expected upon the movement of the levers 30 and 35 resulting from movement of the adjustment member 51. Thus, as the adjustment member 51 is rotated about the pivot pin 55, the arcuate opening 50 contained therein interacting with the oblong opening of the side member 12 results in a vertical movement, as viewed in Figure 3, of the portion 45 of the lever 30 passing through the arcuate opening 50 and the oblong opening 53 of the side member 12. The extremity of the portion 45 of the lever 30 located in the oblong opening 54 of the side member 12 merely changes its horizontal position as viewed in Figure 3. The vertical movement of the portion 45 in the oblong opening 53 results in an oscillating vertical movement, as viewed in Figure 4, of the lever 30 about the portion 31 located in the side member 11. Similarly, the positioning of lever 30 results in vertical positioning, as viewed in Figure 4, of the lever 35 causing the connecting member 38 of the lever 35 to actuate the operating plunger 18 of the switch 17 at selected temperatures, thereby varying the control point of the temperature control arrangement.

It should be here noted that the oscillating movement of the lever 35 also results in a slight radial movement of the portion of the side member 37 of the lever 35 which engages the bimetal element 20, however, this has no significant effect on the operation of the adjustment arrangement.

It will be apparent that while the lever 35 is oscillative along with the lever 30 about the portion 31 of the lever 30 located in the side member 11, the lever 35 is rotatable about the longitudinal axis of the lever 30 due to movement of the bimetal element 20 upon changes in temperatures to which it is subjected. Thus, lever 35 is both oscillative to determine the control point setting of the temperature control arrangement and rotatable to cause actuation of the switch 17.

Figure 5:
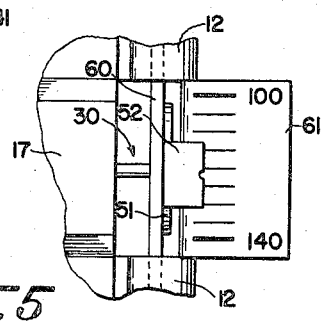
Figure 5 is a view along the lines 5—5 of Figure 2 showing an enlarged portion of the adjustment scale and associated elements.

In Figure 5, the scale portion 61 of the side member 12 is shown in conjunction with the manual operating portion 52 of the adjustment member 51. Also, in Figure 5, the displaced portion 60 of the side member 12 and its relation to the adjustment member 51 is shown in finer detail.

By the utilization of elements formed by simple punch press operations or by simple metal forming procedures, an arrangement has been provided which is easy to manufacture and assemble and which provides a variable adjustment arrangement for the control point setting of a condition control apparatus. Further, the simple lever adjustment arrangement disclosed herein allows for both control point adjustment of a control device and actuation of the control device.

There are of course other embodiments, not shown, which incorporate the principles set forth herein, therefore, the scope of the present invention should be determined from the following claims, in which I claim:

1. Thermostatic control apparatus having a variable control point, the arrangement comprising, a housing having two side members, a bimetal element having a first end portion operatively secured to said housing, a manual adjustment member having an arcuate opening therein and having a portion operatively secured to a first of the side members of said housing, a first lever having a first end portion pivotally disposed in an opening in the second of the side members of said housing and having a second end portion disposed through the arcuate opening in said manual adjustment member and disposed in an oblong opening of said first side member, the arcuate opening in said manual adjustment member and the oblong opening in said first side member being so arranged that movement of said manual adjustment member results in oscillatory movement of said first lever about the first end portion of said first lever disposed in the opening of said second side member, a second lever operatively associated with and carried by so as to be oscillative with said first lever and so as to be rotatable about a longitudinal axis of said first lever, said second lever including a first portion in contact with a second end portion of said bimetal element so as to cause rotation of said second lever about the longitudinal axis of said first lever upon movement of said bimetal element, and a snap switch operatively attached to the side members of said housing and arranged with respect to said second lever so that the plunger of said snap switch is engaged by a second portion of said second lever and is actuated by rotation of said second lever upon movement of said bimetal element due to change in temperature or by movement of said second lever upon oscillatory movement of said first lever due to movement of said manual adjustment member.

2. In condition control apparatus having a variable control point, the arrangement comprising, a housing having two side members, a manual adjustment member having an arcuate opening therein and having a portion operatively secured to a first of the side members of said housing, a first lever having a first end portion pivotally disposed in an opening in the second of the side members of said housing and having a second end portion disposed through the arcuate opening in said manual adjustment member and disposed in an oblong opening of said first side member, the arcuate opening in said manual adjustment member and the oblong opening in said first side member being so arranged that movement of said manual adjustment member results in oscillatory movement of said first lever about the first end portion of said first lever disposed in the opening of said second side member, a second lever operatively associated with and carried by so as to be oscillative with said first lever and so as to be rotatable about a longitudinal axis of said first lever, said second lever including a first portion arranged to engage the actuating portion of a condition sensing means so as to cause rotation of said second lever about the longitudinal axis of said first lever upon movement of the actuating portion of the condition sensing means and a switch operatively attached to the side members of said housing and arranged with respect to said second lever so that the plunger of said switch is engaged and displaced by a second portion of said second lever and is actuated by rotation of said second lever upon movement of the actuating portion of the condition sensing means or by movement of said second lever upon oscillatory movement of said first lever due to movement of said manual adjustment member.

3. In condition control apparatus having a variable control point, the arrangement comprising, a housing having two side members, a manual adjustment member having a cam opening therein and having a portion operatively secured to a first of the side members of said housing, a first lever having a first end portion pivotally disposed in an opening in the second of the side members of said housing and having a second end portion disposed through the cam opening in said manual adjustment member and disposed in an oblong opening of said first side member, the cam opening in said manual adjustment member and the oblong opening in said first side member being so arranged that movement of said manual adjustment member results in oscillatory movement of said first lever about the first end portion of said first lever disposed in the opening of said second side member, a second lever operatively associated with and carried by so as to be oscillative with said first lever and so as to be rotatable about a longitudinal axis of said first lever, said second lever including a first portion arranged to engage the actuating portion of a condition sensing means so as to cause rotation of said second lever about the longitudinal axis of said first lever upon movement of the actuating portion of the condition sensing means, and a control device including an actuating portion arranged with respect to said second lever so that the actuating portion of said control device is engaged and displaced by a second portion of said second lever due to rotation of said second lever upon movement of the actuating portion of the condition sensing means or upon movement of said second lever resulting from oscillatory movement of said first lever due to movement of said manual adjustment member.

4. In control apparatus having a variable control point, the arrangement comprising, a housing having two side members, a manual adjustment member having a cam opening therein and having a portion operatively secured to a first of the side members of said housing, a first lever having a first end portion pivotally disposed in an opening in the second of the side members of said housing and having a second end portion disposed through the cam opening in said manual adjustment member and disposed in an opening of said first side member, the cam opening in said manual adjustment member and the opening in said first member being so arranged that movement of said manual adjustment member results in oscillatory movement of said first lever about the first end portion of said first lever disposed in the opening of said second side member, a second lever operatively associated with and carried by so as to be oscillative with said first lever and so as to be rotatable about a longitudinal axis of said first lever, said second lever including a first portion arranged to have an operating force applied thereto so as to cause rotation of said second lever about the longitudinal axis of said first lever upon application of the operating force, and a control device including an actuating portion arranged with respect to said second lever so that the actuating portion of said control device is engaged and displaced by a second portion of said second lever upon rotation of said second lever due to application of the operating force or upon movement of said second lever resulting from oscillatory movement of said first lever due to movement of said manual adjustment member.

5. In control apparatus having a variable control point setting, the arrangement comprising, a housing having two side members, an adjustment member having an opening therein and associated with a first of the side members of said housing, a first lever having a first end portion pivotally disposed in an opening in the second of the side members of said housing and having a second end portion disposed through the opening in said adjustment member and disposed in an opening of said first side member, the opening in said adjustment member and the opening in said first side member being so arranged that movement of said adjustment member with respect to said side member results in oscillatory movement of said first lever about the first end portion of said first lever disposed in the opening of said second side member, a second lever operatively associated with and carried by so as to be oscillative with said first lever and so as to be rotatable about a longitudinal axis of said first lever, said second lever including a first portion arranged to have an operating force applied thereto so as to cause rotation of said second lever about the longitudinal axis of said first lever upon application of the operating force, and a control device including an actuating portion arranged with respect to said second lever so that the actuating portion of said control device is engaged and displaced by a second portion of said second lever upon rotation of said second lever due to application of the operating force or upon movement of said second lever resulting from oscillatory movement of said first lever due to movement of said adjustment member with respect to first side member.

6. In control apparatus, the arrangement comprising, a housing having two side members, an adjustment member having an opening therein and associated with a first of the side members of said housing and arranged for relative movement therewith, an actuating mechanism having a first portion pivotally disposed in an opening in the second of the side members of said housing and having a second portion disposed through the opening in said adjustment member and disposed in an opening of said first side member, the opening in said adjustment member and the opening in said first side member being so arranged that movement of said adjustment member results in oscillatory movement of said actuating mechanism about the first portion of said actuating mechanism disposed in the opening of said second side member, and a control device including an actuating portion, said actuating mechanism including a third portion displaced from the longitudinal axis of the first and second portions of said actuating mechanism and normally positioned toward and arranged with respect to the actuating portion of said control device so that the actuating portion of said control device is engaged and displaced by the third portion of said actuating mechanism upon oscillatory movement of said actuating mechanism due to movement of said adjustment member.

7. In control apparatus, the arrangement comprising, a housing, an adjustment member associated with said housing and arranged for relative movement therewith, an actuating mechanism having a first portion pivotally arranged with respect to said housing and having a second portion operatively positioned by said adjustment member, said adjustment member and said actuating means being so arranged that relative movement of said adjustment member with respect to said housing results in oscillatory movement of said actuating mechanism about the first portion thereof, and a control device including an actuating portion, said actuating mechanism including a third portion displaced from the longitudinal axis of the first and second portions of said actuating mechanism and normally positioned toward and arranged with respect to the actuating portion of said control device so that the actuating portion of said control device is engaged and displaced by said third portion of said actuating mechanism upon oscillatory movement of said actuating mechanism due to movement of said adjustment member.

8. In control apparatus, the arrangement comprising, a housing, an adjustment member associated with said housing, and arranged for relative movement therewith, an actuating mechanism having a first portion pivotally arranged with respect to said housing and having a second portion operatively positioned by said adjustment member, said adjustment member and said actuating means being so arranged that relative movement of said adjustment member with respect to said housing results in oscillatory movement of said actuating mechanism about the first portion thereof, and a control device, said actuating mechanism including a third portion displaced from the longitudinal axis of the first and second portions of said actuating mechanism and arranged with respect to said control device so that the relative distance therebetween is varied upon oscillatory movement of said actuating mechanism due to movement of said adjustment member.

9. In control apparatus, the arrangement comprising, a control device and an actuating mechanism having a first portion pivotally arranged with respect to said control device and having a second portion movable with respect to said control device so as to result in oscillatory movement of said actuating mechanism about said first portion upon a positioning of said actuating mechanism, said actuating mechanism including a third portion displaced from the longitudinal axis of the first and second portions of said actuating mechanism and arranged with respect to said control device so that the relative distance therebetween is varied upon positioning of said actuating mechanism.

10. In control apparatus, the arrangement comprising, a frame, a switch carried by said frame and having an operating plunger, a first lever pivotally adjustable in said frame in a plane parallel to but displaced from the path of movement of said plunger, a second lever pivotally carried on said first lever and having a portion adapted to engage said plunger, said second lever engaging said plunger at a point displaced from the pivotal axis of said first lever, and a bimetal carried on said frame and having means associated therewith movable on temperature change in a direction normal to the path of plunger movement, said means being disposed to engage said second lever at a point displaced from the pivotal axis of said second lever in the direction of the path of movement of said plunger.

11. In control apparatus, the arrangement comprising, a frame, a switch carried by said frame and having an operating plunger, a first lever pivotally adjustable in said frame in a plane parallel to but displaced from the path of movement of said plunger, a second lever pivotally carried on said first lever and having a portion adapted to engage said plunger, said second lever engaging said plunger at a point displaced from the pivotal axis of said first lever, a bimetal carried on said frame and having means associated therewith movable on temperature change in a direction normal to the path of plunger movement, said means being disposed to engage said second lever at a point displaced from the pivotal axis of said second lever in the direction of the path of movement of said plunger, a scale on said frame having indicia of temperature, and an index positioned with said first lever cooperating with said scale to indicate the temperature at which said switch is actuated.

12. In control apparatus, the arrangement comprising, a frame, a switch carried by said frame and having an operating plunger, a first lever pivotally adjustable in said frame in a plane parallel to but displaced from the path of movement of said plunger, a second lever pivotally carried on said first lever and having a portion adapted to engage said plunger, said second lever engaging said plunger at a point displaced from the pivotal axis of said first lever, and means including a bimetal carried on said frame, said means being disposed to engage said second lever at a point displaced from the pivotal axis of said second lever in the direction of the path of movement of said plunger.

13. In control apparatus, the arrangement comprising, a control device having an operator that moves in a predetermined path, a member adjustable in the direction of movement of said operator, a lever pivoted on said member on an axis normal to the direction of movement of said operator but displaced therefrom and having a portion adapted to engage said operator, and a control element having a portion movable in a direction normal to the direction of movement of said operator, the movable portion of said element engaging said lever at a point displaced from the pivotal axis of said lever in the direction of movement of said operator.

14. In control apparatus, the arrangement comprising, a control device having an operator that moves in a predetermined path, a member adjustable in the direction of movement of said operator, a lever pivoted on said member on an axis normal to the direction of movement of said operator but displaced therefrom and having a portion adapted to engage said operator, a control element having a portion movable in a direction normal to the direction of movement of said operator, the movable portion of said element engaging said lever at a point displaced from the pivotal axis of said lever in the direction of movement of said operator, and an indicator associated with said adjustable member to show the relation between said control element and said control device.

References Cited in the file of this patent

UNITED STATES PATENTS

| | | |
|---|---|---|
| 2,289,973 | Lake | July 14, 1942 |
| 2,489,854 | Brockman | Nov. 29, 1949 |